Aug. 11, 1953  J. W. DAWSON ET AL  2,648,772
MAGNETRON CONTROL CIRCUITS
Filed Feb. 15, 1949

INVENTORS
JOHN W. DAWSON
FRITZ A. GROSS
THOMAS A. O. GROSS
By
ATTORNEY

Patented Aug. 11, 1953

2,648,772

UNITED STATES PATENT OFFICE 2,648,772

MAGNETRON CONTROL CIRCUITS

John W. Dawson, Newton, Fritz A. Gross, Weston, and Thomas A. O. Gross, South Lincoln, Mass., assignors to Raytheon Manufacturing Company, Newton, Mass., a corporation of Delaware Application February 15, 1949, Serial No. 76,602

11 Claims. (Cl. 250—36)

This application relates to control circuits and more particularly to a circuit whereby the power output of a magnetron may be regulated.

In many applications, for example, electronic cooking of food, and the dielectric heating of material, it is desired that the power output of the high frequency oscillation generation device be maintained extremely constant, so that by feeding power into the article to be cooked or the article to be heated for a given time the total energy applied thereto may be closely regulated. This is particularly desirable in the case of food, wherein a variation of a few per cent in the amount of energy may render the food unpalatable.

Further, in the magnetrons which are used as a source of high frequency energy, a variation of a few per cent in the applied voltage will cause a large variation in the power output since the anode current of a magnetron varies as a nonlinear function of the applied voltage.

Accordingly, it is an object of this invention to provide means whereby the power output of a magnetron will be closely regulated.

Another object of this invention is to provide a device whereby the magnetic field of the magnetron may be varied as a function of the anode current of said magnetron.

Yet another object of this invention is to provide a circuit whereby the magnetic field of a magnetron may be varied as a function of the voltage applied to the magnetron.

A still further object of this invention is to provide a means for producing the required magnetic field for a magnetron before anode current flows in said magnetron.

Other and further objects of this invention will become apparent as the description thereof progresses, reference being had to the accompanying drawings wherein.

Figure 1:
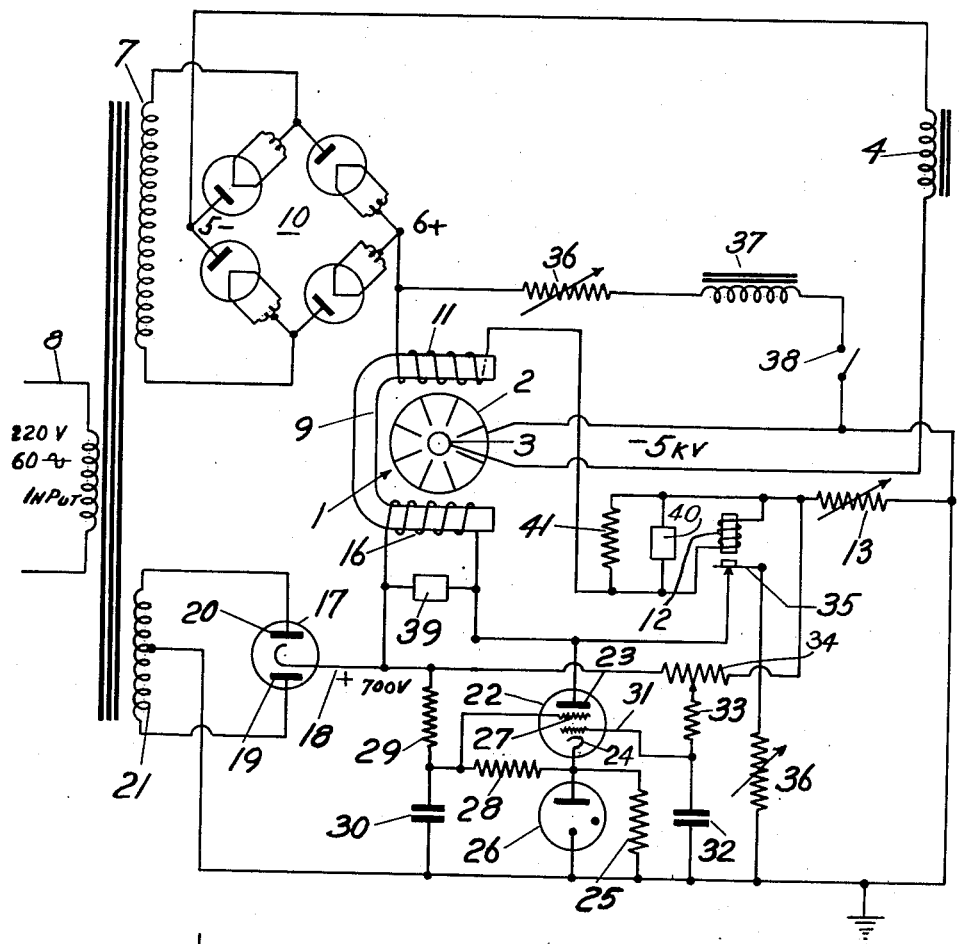
Fig. 1 represents a schematic diagram of an embodiment of this invention.

Referring now to Fig. 1 there is shown diagrammatically a magnetron 1 having an anode structure 2 and a cathode structure 3. The anode 2 of the magnetron is connected to ground and the cathode 3 of the magnetron is connected to a suitable negative potential for operation, for example, minus 5,000 volts. This negative source comprises a bridge rectifier 10 made up of four diodes in a standard bridge rectifier circuit. More specifically the cathode 3 is connected through a smoothing choke 4 to the negative terminal 5 of the bridge rectifier 10 which is a junction between the plates of two of the diodes. The positive terminal of the bridge rectifier 6 is connected to ground through a control circuit which will be later described. The bridge rectifier is supplied by a secondary winding 7 of a transformer. The primary winding 8 of the transformer is connected to a suitable source of power, for example, 220 volts, 60 cycles.

The positive terminal 6 of the bridge rectifier 10 is connected to one end of a magnetic coil 11 wound about the magnetic field core 9 of the magnetron 1. This magnetic coil 11 has its other end connected to one side of a relay solenoid 12. The other side of solenoid 12 is connected through a variable resistor 13 to ground thus completing the high voltage supply circuit for the magnetron. It may be seen that, since the high voltage supply circuit has the magnet coil 11 in series therewith, the current flow in the magnetron will cause a variation in the magnetic flux across the interaction space of the magnetron.

Figure 2:
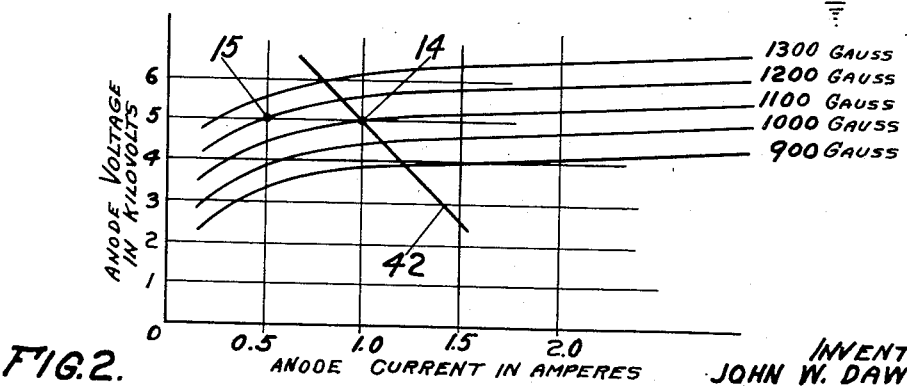
Fig. 2 represents characteristic curves of operation of a magnetron.

Referring now to Fig. 2, there is shown a graph illustrating characteristic curves of operation of a magnetron as used in this invention. Along the ordinate is plotted the anode current in amperes and along the abscissa is plotted anode voltage in kilovolts. These curves represent the anode voltage current characteristics for various values of the magnetic field applied across the interaction space of the magnetron. For example, in normal operation as represented by point 14 with a magnetic field intensity of 1,100 gauss and an anode voltage of 5,000 volts, the anode current will be approximately 1 ampere. However, if the magnetic field is increased to 1,200 gauss with 5,000 volts anode voltage, the anode current will drop considerably, for example, to a half ampere, as shown by point 15. Therefore, it may be seen that, by causing the anode current to vary the magnetic field, the anode current will be quite stable since if the anode current attempts to increase for any reason, such as changes in anode voltage, it will cause an increase in the magnetic field which will counteract the effects which initially caused the increase in current. However, substantial variations in voltage due to variations in the supply line voltage connected to the primary 8 of the transformer will cause a substantial change in the power output since, even if the current is maintained substantially constant, the power output will vary directly with the voltage since the power output is equal to the voltage input times the current input times the efficiency, and the efficiency of the magnetron will remain substantially constant over the desired range of operation of the magnetron. Therefore, in order to maintain the power output constant for voltage changes in the anode potential, it is necessary to cause inverse variations of the anode current with respect to variations in the anode voltage. This is accomplished by varying the magnetic field by means of current through a second coil 16 whose magneto motive force adds to that of coil 11 in the magnetic circuit of the pole 9 of the magnetron. The source of current of the coil 16 is a regulating system of a type now to be described.

A D. C. voltage supply of 700 volts is obtained from a full wave rectifier circuit comprising a duodiode 17 whose common cathode 18 is connected to the plus 700 volt bus of the system. The plates 19 and 20 of the duodiode are connected, respectively, to opposite ends of another secondary winding 21 of the transformer fed by the primary winding 8. A center tap of the winding 21 is connected to ground. This 700 volt power supply supplies a power tetrode 22 which may be, for example, a type 807 vacuum tube. The plate 23 of the tube 22 is connected through the coil 16 on the magnetron field pole 9 to cathode 18 which produces the positive potential of 700 volts. The cathode 24 of the tube 22 is connected to ground through a resistor 25. A voltage regulator tube 26 is connected across resistor 25 so that the potential of cathode 24 is maintained at a fixed value above ground potential, for example, 150 volts. The screen grid 27 is maintained at an operating potential above the cathode 24 of, for example, 250 volts by being connected to the junction of two resistors 28 and 29 which constitute a voltage divider. The resistor 28 is connected to the cathode 24 and resistor 29 is connected to the 700 volt source. The screen grid 27 of tube 22 is also connected to ground through a transient by-pass condenser 30. The grid 31 of the tube 22 is connected to ground through a transient by-pass condenser 32 and through a grid current limiting resistor 33 to the variable tap of potentiometer 34. One side of the potentiometer 34 is connected to the 700 volt supply and the other side of the potentiometer 34 is connected to the junction between the solenoid 12 and the variable resistor 13 in the high voltage supply circuit of the magnetron. The plate 23 of tube 22 is connected to ground through the contacts of a switch 35, which is operated by the solenoid 12, and a variable resistor 36. The contacts 35 are normally open during operation of the magnetron due to energization of the solenoid 12 by anode current of the magnetron 1. However, in the absence of anode current the contacts 35 are biased closed, for example, by a spring.

A circuit for increasing the power of the magnetron to produce, for example, in an electronic cooker two cooking rates, consists of a connection from the positive terminal 6 of the bridge rectifier 10 through a variable resistance 36 and inductance 37 and a manually-operated switch 38 to ground. With the manually operated switch open a certain anode current will flow through the magnetron for a given line voltage, said current being dependent upon the magnetic field in the magnetron. By shunting the magnetic coil 11 with a circuit having approximately the same resistance as that of the circuit shunted, substantially double the amount of current may be caused to flow through the magnetron. Therefore, resistance 36 is adjusted to this condition, and by closing switch 38 the power output from the magnetron may be doubled or, conversely, by opening the switch 38, power output may be halved. In the present design with the switch 38 closed, the anode current in the magnetron used is approximately 1 ampere. For an anode potential of 5,000 volts as shown by point 14, the inductance 37 is made equal to the inductance of coil 11, thereby equalizing the surge impedance to magnetron current ratio, for the two power levels.

In order that a magnetron field be placed across the magnetron wherein operation of the magnetron at the desired frequency may be initiated, a circuit is provided to supply this field in the absence of magnetron anode current. When there is no magnetron anode current the solenoid 12 will be deenergized and the contacts 35 closed. This completes a circuit from the positive bus of the 700 volt supply through winding 16, the switch 35 and an adjustable resistor 36 to ground whereby current flows in the coil 16. The resistor 36 is adjusted to a value such that the required magnetizing current flows through coil 16 to produce the proper magnetic field in the magnetron in the absence of anode current in the magnetron. When anode current flows in the magnetron the solenoid is energized, thereby breaking this circuit.

With anode current flowing in the magnetron, the magnetic field is supplied partially by the coil 11 due to the anode current flowing therethrough, and partially by current flowing through coil 16 due to conduction of tube 22. This conduction of tube 22 is regulated in the following manner. The bias on grid 31 is adjusted to a few volts negative with respect to the cathode 24 such that the tube 22 is biased roughly at the midpoint of operation of its characteristic curves of operation, by means of the following circuit.

The cathode 24 is maintained at 150 volts positive with respect to ground by action of the tube 26. The tube 26 is by-passed by a resistor 25 which is of such a value that it passes enough of the space current of the tube 22 to allow the voltage regulating tube 26 to operate at about the midpoint of its curve of operation. The resistor 13 is adjusted to a value such that the drop thereacross due to anode current in the magnetron is approximately 75 volts. The tap on the potentiometer 34 is then adjusted such that it adds to the 75 volt drop across the resistor 13 another voltage of roughly 75 volts up to the point on resistor 34 where its tap is set, thus giving the correct bias voltage on the tube 22. Thus it may be seen that the grid-to-cathode voltage on the tube 22 may be changed by variations either in the anode current of the magnetron which will cause a change in the voltage across the resistor 13 or by variations in the voltage of the 700 volt supply due to variations in the supply line voltage feeding the primary winding 8, which will cause a change in the voltage drop between the tap on resistor 34 and the junction between resistor 34 and resistor 13. It may be noted that the variation of voltage between the tap on resistor 34 and the junction between resistors 34 and 13 will be proportional to variations in the supply line voltage, for any given setting of the tap on resistor 34 and, therefore, will be proportional to variations in the 5 kilovolt anode voltage supply of the magnetron 1.

Due to the large power amplification of the tube 22 small variations in the grid-to-cathode voltage of the tube will cause large variations in the magnetic flux produced by the coil 16. Therefore, at all times the grid-to-cathode voltage of tube 22 will remain substantially constant throughout variations in anode voltage and current of the magnetron. For this reason it may be seen that, since the voltage drop from the tap on resistor 34 to the junction between resistor 34 and resistor 13 plus the voltage drop across resistor 13 must remain constant, and since these two voltage drops are approximately equal, it follows that, if the voltage of the supply varies, for example, ten per cent, in either direction, the anode current of the magnetron must vary ten per cent in the opposite direction in order that the voltage drop from the grid 31 to ground remain substantially constant. Therefore, since the power output is proportional to the supply voltage times the anode current of the magnetron this power will be, upon variation of ten per cent, equal to 110 per cent times 90 per cent or 99 per cent of the power output with no variation, thus demonstrating that the power output of the magnetron by this circuit is regulated to have a variation of about one-tenth the percentage that the supply line voltage varies.

It may be noted that, while this regulation is not perfect due to the fact that it operates on the principle of making the sum of two variables equal to a constant rather than the principle of making the product of two variables equal or constant, this solution represents a much more inexpensive solution to the problem than regulating devices which operate on the product principle.

In order to eliminate dangerously high voltages induced in the coils 16 and 12 by circuit transients due, for example, to sparking in the magnetron 1, the coil 16 is connected in parallel with a nonlinear impedance which may be, for example, a Thyrite resistor 39. For normal currents, this Thyrite resistor 39 will be a high impedance. However, for high transient currents the Thyrite resistor will approach a short circuit. Similarly, the solenoid 12 has connected in parallel therewith a Thyrite resistor 40 which will protect said solenoid from high transient currents. Also, in this modification the solenoid 12 has in parallel therewith a resistor 41 which bypasses the anode current of the magnetron in excess of that required to energize the solenoid 12.

With the system described the anode voltage to anode current variations would follow substantially along the line 42 on the graph of Fig. 2.

This completes the description of the illustrated embodiment of my invention. However, many modifications therein will be apparent to persons skilled in the art; for example, any type of rectifiers could be used for the bridge rectifier 10 and the rectifying tube 17, a permanent magnet magnetron could be used in conjunction with the variable magnetic field produced in the core 9, and various methods of creating the total voltage supplied to the grid 31 might be used as well as various adjustments and settings of the variable resistors 36, 13 and potentiometer 34. Accordingly, applicant does not wish to be limited to the specific details of the embodiment illustrated except as defined in the appended claims.

What is claimed is:

1. In combination an electron discharge device having a resonating anode structure and a cathode, means for supplying a magnetic field across said discharge device to thereby cause oscillations in said device, and means for maintaining the power output of said device substantially constant comprising a circuit varying said magnetic field as a function of the voltage applied to said discharge device.

2. In combination an electron discharge device having a resonating anode structure and a cathode, means for supplying a magnetic field across said discharge device to thereby cause oscillations in said device, and a circuit varying said magnetic field as a function of the voltage applied to said discharge device and as a function of the space current flowing in said discharge device.

3. In combination an electron discharge device having a resonating anode structure and a cathode, means for supplying a magnetic field across said discharge device to thereby cause oscillations in said device, comprising an electromagnet, and means for varying said magnetic field as a function of the voltage applied to said discharge device, and means for energizing at least a portion of said electromagnet by space current of said discharge device.

4. In combination an electron discharge device having a resonating anode structure and a cathode, means for supplying a magnetic field across said discharge device to thereby cause oscillations in said device, comprising an electromagnet, and means for varying said magnetic field as a function of the voltage applied to said discharge device, comprising a power amplifier, whose output energizes a portion of said electromagnet, and whose input signal varies as a function of the voltage applied across said discharge device.

5. In combination an electron discharge device having a resonating anode structure and a cathode, means for supplying a magnetic field across said discharge device to thereby cause oscillations in said device, comprising an electromagnet, and means for varying said magnetic field as a function of the voltage applied to said discharge device, comprising a power amplifier whose output energizes a portion of said electromagnet, and whose input signal varies as a function of the voltage applied across said discharge device and as a function of the space current flowing in said discharge device.

6. In combination an electron discharge device having a resonating anode structure and a cathode, means for supplying a magnetic field across said discharge device to thereby cause oscillations in said device, comprising an electromagnet a portion of which is energized by space current of said discharge device, and means for varying said magnetic field as a function of the voltage applied to said discharge device, comprising a power amplifier whose output energizes a portion of said electromagnet, and whose input signal varies as a function of the voltage applied across said discharge device.

7. In combination an electron discharge device having a resonating anode structure and a cathode, means for supplying a magnetic field across said discharge device to thereby cause oscillations in said device, comprising an electromagnet a portion of which is energized by space current of said discharge device, and means for varying said magnetic field as a function of the voltage applied to said discharge device, comprising a power amplifier whose output energizes a portion of said electromagnet, and whose input signal varies as a function of the voltage applied across said discharge device and as a function of the space current flowing in said discharge device.

8. In combination an electron discharge device having a resonating anode structure and a cathode, means for supplying a magnetic field across said discharge device to thereby cause oscillations in said device, means for varying said magnetic field as a function of the voltage applied to said discharge device and as a function of the space current flowing in said discharge device, and means for creating an increased magnetic field in the absence of a space current in said discharge device.

9. In combination an electron discharge device having a resonating anode structure and a cathode, means for supplying a magnetic field across said discharge device to thereby cause oscillations in said device, means for varying said magnetic field as a function of the voltage applied to said discharge device and as a function of the space current flowing in said discharge device, and means for creating an increased magnetic field in the absence of a space current in said discharge device, comprising a relay circuit responsive to said space current.

10. In combination an electron discharge device having a resonating anode structure and a cathode, means for supplying a magnetic field across said discharge device to thereby cause oscillations in said device, comprising an electromagnet, means for varying said magnetic field as a function of the voltage applied to said discharge device and as a function of the space current flowing in said discharge device, and means for creating an increased magnetic field in the absence of a space current in said discharge device, comprising a relay responsive to said space current for by-passing an impedance in series with a portion of said electromagnet winding.

11. In combination an electron discharge device having a resonating anode structure and a cathode, means for supplying a magnetic field across said discharge device to thereby cause oscillations in said device, comprising an electromagnet a portion of which is energized by space current of said discharge device, means for varying said magnetic field as a function of the voltage applied to said discharge device, comprising a power amplifier whose output energizes a portion of said electromagnet, and whose input signal varies as a function of the voltage applied across said discharge device and as a function of the space current flowing in said discharge device, and means for creating an increased magnetic field in the absence of a space current in said discharge device, comprising a relay responsive to said space current for by-passing said power amplifier.

JOHN W. DAWSON.
FRITZ A. GROSS.
THOMAS A. O. GROSS.

References Cited in the file of this patent
UNITED STATES PATENTS

| Number | Name | Date |
|---|---|---|
| 2,122,495 | Scott | July 5, 1938 |
| 2,142,345 | Braden | Jan. 3, 1939 |
| 2,201,666 | Hollman | May 21, 1940 |
| 2,296,764 | Braden | Sept. 22, 1942 |
| 2,412,772 | Hansell | Dec. 17, 1946 |